L. FAUST & W. A. BROLIN.

FURNITURE.

APPLICATION FILED MAR. 23, 1908.

12,905.

Reissued Dec. 29, 1908.

2 SHEETS—SHEET 1.

Witnesses:
U. P. Kilroy
Robert N. Weir

Inventors
Levin Faust
Willard A. Brolin
By Luther L. Miller
atty.

THE NORRIS PETERS CO., WASHINGTON, D. C.

L. FAUST & W. A. BROLIN.

FURNITURE.

APPLICATION FILED MAR. 23, 1908.

12,905.

Reissued Dec. 29, 1908.

2 SHEETS—SHEET 2.

Witnesses:
U. P. Kilroy
Robert H. Weir

Inventors
Levin Faust
Willard A. Brolin
By Luther L. Miller
Atty.

THE NORRIS PETERS CO., WASHINGTON, D. C.

UNITED STATES PATENT OFFICE.

LEVIN FAUST AND WILLARD A. BROLIN, OF ROCKFORD, ILLINOIS, ASSIGNORS OF ONE-FOURTH TO K. E. KNUTSSON AND ONE-FOURTH TO C. J. SWENSON, BOTH OF ROCKFORD, ILLINOIS.

FURNITURE.

No. 12,905. Specification of Reissued Letters Patent. Reissued Dec. 29, 1908.

Original No. 835,507, dated November 13, 1906, Serial No. 298,694. Application for reissue filed March 23, 1908. Serial No. 422,865.

*To all whom it may concern:*

Be it known that we, LEVIN FAUST and WILLARD A. BROLIN, citizens of the United States of America, residing at Rockford, in the county of Winnebago and State of Illinois, have invented certain new and useful Improvements in Furniture, of which the following is a specification.

Our invention relates specifically to mechanism for equalizing the travel of the opposite ends of bookcase doors or closures and bureau and other sliding drawers and similar slidable parts of furniture.

Figure 1:
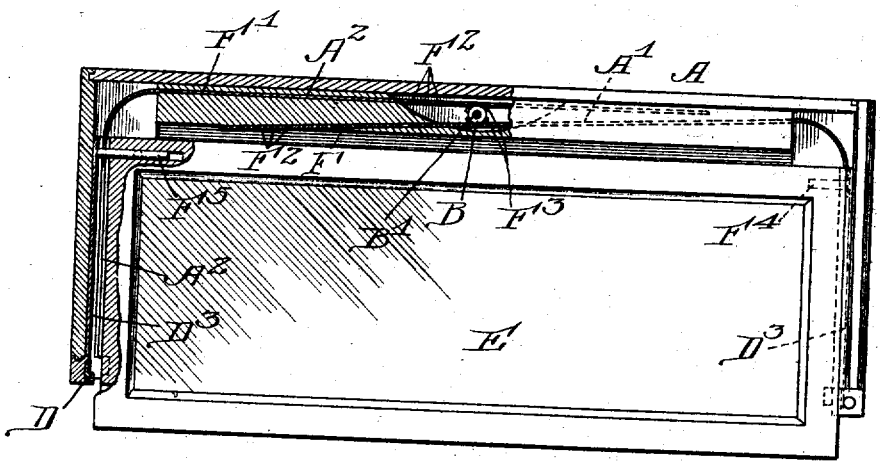
Figure 2:
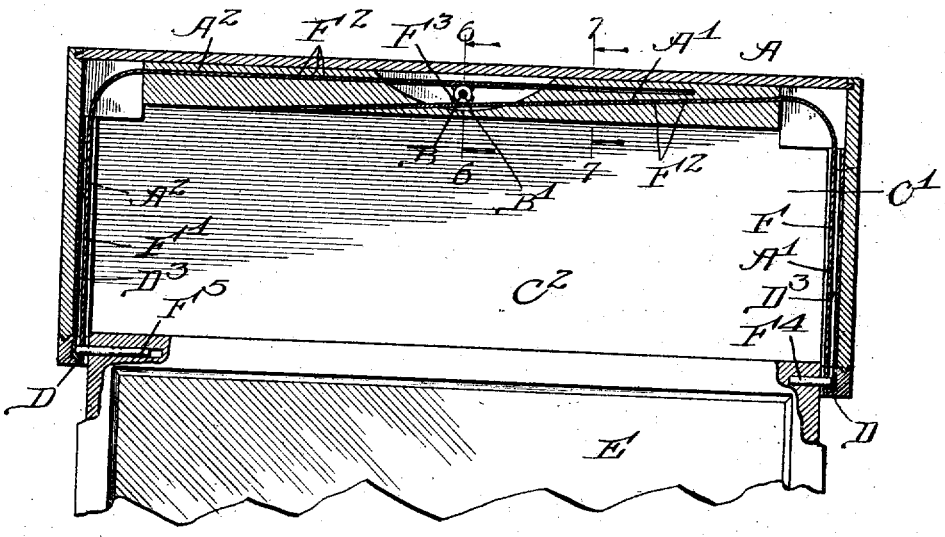
Figure 3:
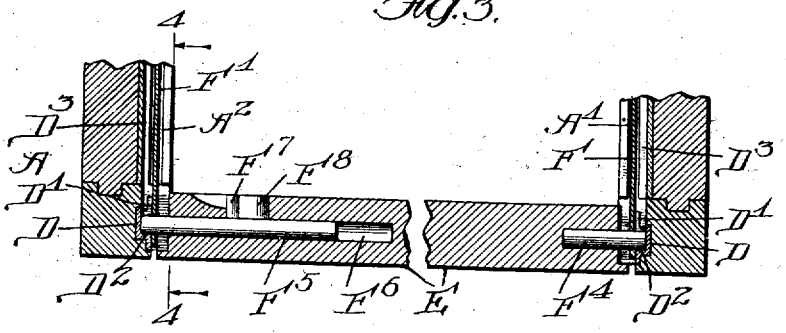
Figure 4:
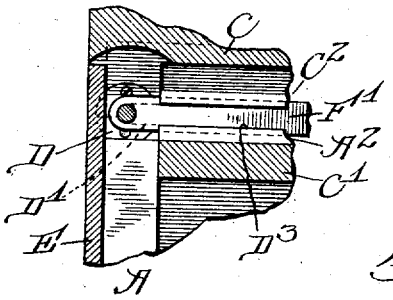
Figure 5:
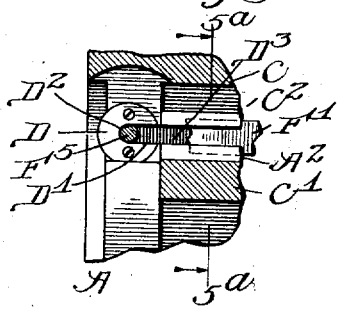
Figure 5A:
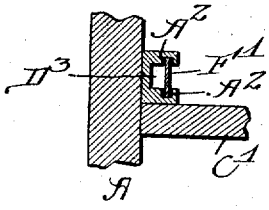
Figure 6:
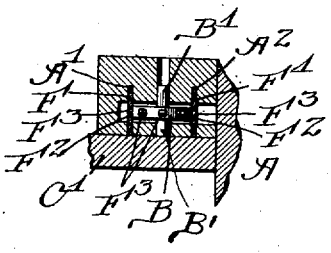
Figure 7:
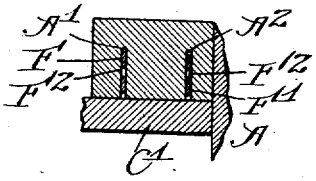
Figure 8:
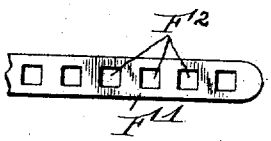

Referring to the accompanying drawings, which form a part of this specification, Figure 1 is a sectional bookcase embodying our invention with the top thereof removed therefrom and some parts broken away to show the interior construction, arrangement, and operation of the movable parts of the same. Fig. 2 is a like view of the same with parts thereof in different positions from those shown in Fig. 1, which latter figure shows the closure of the bookcase open and slid inward to its backward limit of travel, while Fig. 2 shows the closure slid outward to its forward limit of travel and ready to be swung vertically downward to a closed position. Fig. 3 is an enlarged sectional detail of the end portions of a single section of a bookcase, showing a preferred means for slidably connecting the closure therewith and also for pivotally connecting such closure with its equalizing mechanism. Fig. 4 is a section at the dotted line 4 4 in Fig. 3 of parts there shown, including a fragment of the top of such section. Fig. 5 is a partial section at the dotted line 4 4 in Fig. 3 of parts there shown, with another part thereof broken away. Fig. $5^a$ is a section at the dotted line $5^a$ $5^a$ in Fig. 5 of parts there shown. Fig. 6 is an enlarged section at the dotted line 6 6 in Fig. 2 of parts there shown. Fig. 7 is an enlarged section at the dotted line 7 7 in Fig. 2 of parts there shown. Fig. 8 is an enlarged sectional detail of one of the sprocket-tapes of the bookcase.

Like letters of reference indicate corresponding parts throughout the several views.

The embodiment selected for illustration comprises a bookcase section A of the usual or any desired construction, having guideways A′ $A^2$ therein, extending transversely thereto and substantially parallel to each other from its front or opening to the rear portion thereof and thence curving inward at substantially right angles and lapping by and diverging from each other.

B is a sprocket-pinion rotatably mounted on a pintle B′, between and projecting peripherally into the diverging portions of the guideways A′ $A^2$.

C is the top of the section A and may also constitute the bottom of a section (not shown) resting on the section A.

C′ is a partition arranged horizontally below and parallel to the section-top C and a sufficient distance therefrom to form a recess $C^2$ to admit a closure of the section A.

D′ represents disks slotted radially at D′ to form stops $D^2$ for parts to be described hereinafter and are preferably countersunk into the body of the case, so that such slots D′ therein will register longitudinally with parallel grooves $D^3$ in the case, Fig. 5.

E is a closure for the opening in the front of the section A and is slidably mounted in the recess $C^2$ therein.

F F′ are sprocket-tapes (formed, preferably, of thin strips of flexible steel perforated transversely and at regular intervals to form openings $F^2$ therethrough to engage the sprockets $F^3$ on the pinion B) extending lengthwise through the guideways A′ $A^2$ and pivot-jointed, by means of pintles $F^4$ $F^5$, to the ends of the closure $C^3$, such pintles $F^4$ $F^5$ projecting into engagement with the grooves $D^3$ in the section A and serving as slidable bearings for the closure $C^3$. The pintles $F^4$ $F^5$ are herein illustrated as withdrawable from the openings in the tapes through which they extend, and the pintle $F^5$ is movable out from behind its stop $D^2$ in order to permit of removing the door E from the bookcase. In the present construction the pintle $F^5$ is slidable in its opening $F^6$ out of engagement with the tape F′. A stud $F^7$ is fixed to said pintle and projects through a slot $F^8$ in the door E into position to be engaged by the operator when the door is tilted upward. After sliding the pintle $F^5$ inward out of connection with the tape F′, that end of the door may be swung outward until it is clear of the bookcase, after which the pintle $F^4$ may be withdrawn from its tape F. The sprocket-tapes F F′ being formed of inelastic and longitudinally-unyielding material and each engaging with the pinion B will obviously serve positively and accurately to equalize the sliding travel of a bookcase closure, a bureau or other drawer, or any similar sliding part in furniture or elsewhere.

We wish it to be understood that we desire not to be limited to the details of construction shown and described, for modifications will occur to a person skilled in the art.

Having fully described our invention, what we claim as new, and desire to secure by Letters Patent, is—

1. In combination, a case-section or similar structure having guideways therein extending transversely thereto and substantially parallel to each other from the front to the rear portion thereof and thence curving inward at substantially right angles and lapping by and diverging from each other, a sprocket-pinion rotatably mounted between and projecting peripherally into the diverging portions of the guideways, a closure for the opening in the structure and sprocket-tapes engaging substantially opposite sprockets on the pinion and extending therefrom lengthwise through the guideways to and connecting with the ends of the closure of the structure.

2. In combination, a case-section A having guideways $A'$ $A^2$ therein extending transversely thereto and substantially parallel to each other from the opening in the front thereof to its rear portion and thence curving inward at substantially right angles and lapping by and diverging from each other, a sprocket-pinion B rotatably mounted between and projecting peripherally into the diverging portions of the guideways $A'$ $A^2$, a closure E for the opening in the case-section, and sprocket-tapes F $F'$ engaging substantially opposite sprockets on the pinion B and extending therefrom lengthwise through the guideways $A'$ $A^2$ to and connecting with the ends of the closure E of the case-section A.

3. An article of furniture having therein guideways extending transversely thereto and substantially parallel to each other from the front to the rear portion thereof and thence curving inward at substantially right angles and lapping by each other; a sprocket-pinion rotatably mounted between the overlapping portions of said guideways; a movable part; and flexible members connected with said movable part and extending through said guideways, said members having openings therein to receive the teeth of said sprocket pinion.

4. A bookcase having a guideway at each end thereof, said guideways being continued along the back of the bookcase, the last mentioned portions of said guideways extending past each other; a door mounted to move in said bookcase; flexible members attached to the ends of said door and mounted in said guideways; and means located between the overlapping portions of said guideways for connecting said flexible members together.

5. An article of furniture having a movable part, two flexible tapes attached at one end to the ends of said part, and means for guiding said tapes to move in non-rectilinear paths toward and away from each other, the adjacent ends of said tapes being connected together, said guiding means preventing said tapes from buckling.

6. An article of furniture having therein a movable part and two approximately parallel, curved guideways; oppositely disposed flexible members incased in said guideways and attached to said movable part, said guideways preventing said flexible members from buckling; and means located between said guideways for connecting said flexible members together.

7. An article of furniture having therein a movable part and two approximately parallel, curved guideways; oppositely disposed flexible members incased in said guideways and attached to said movable part, said guideways preventing said flexible members from buckling; and a pinion located between said guideways and meshing with said flexible members.

8. An article of furniture having therein a movable part and two curved guideways; two flexible metallic members attached to said movable part and incased in said guideways, said guideways preventing said flexible members from buckling; and a pinion located between said guideways, said members being adapted to mesh with said pinion.

9. An article of furniture having therein a movable part and two guideways, each of said guideways being substantially right-angular in form, portions of said guideways extending past each other; two flexible members attached to said movable part and mounted in said guideways; and means for connecting said flexible members together where they extend past each other.

10. A bookcase having therein a movable door and two guideways; and two flexible metallic tapes attached to the ends of said door and mounted in said guideways and connected together.

11. An article of furniture having a guideway upon the inner face of each of its ends, and a groove extending parallel with each guideway; a pivoted door having pivots mounted to slide in said grooves; and metallic tapes connected at one end with said door and incased in said guideways the other ends of said tapes being connected together.

12. An article of furniture having therein a movable part and two guideways, each of said guideways being substantially right-angular in form, portions of said guideways extending past each other; two flexible members attached to said movable part and mounted in said guideways, said flexible members being connected together.

13. An article of furniture having a movable part, two flexible members connected to said movable part and to each other, and guideways incasing said flexible members to prevent buckling thereof.

14. An article of furniture having a part mounted to move therein; two guideways, portions of said guideways extending in the direction of movement of said movable part, other portions of said guideways extending substantially at right angles with the first mentioned portions of said guideways; and two metallic tapes mounted in said guideways and each connected to said movable part at one end and to another tape at its remaining end.

15. An article of furniture comprising a case having a door; a flexible member attached to each end of said door; means in the rear of said case incasing said flexible members to prevent buckling thereof, said members extending toward each other at the rear of the case and being connected together at the rear of the case; and means at each end of said case for guiding said members.

16. An article of furniture comprising a case having guideways in its opposite ends extending from front to rear, said guideways making a substantially right-angle turn at the rear of the case and thence extending horizontally; a door; and flexible members connected to said door and to each other, said flexible members lying in said guideways.

In testimony whereof we have signed our names to this specification in the presence of two subscribing witnesses.

LEVIN FAUST.
W. A. BROLIN.

Witnesses:
G. E. JOHNSON,
HANNAH E. SWEMBERG.